United States Patent Office 2,850,525
Patented Sept. 2, 1958

2,850,525

ALKALI METAL SALTS OF TRIDECYL α-METHYL-β-SULFOPROPIONATE AND A PROCESS FOR THEIR PRODUCTION

Edward L. Doerr, Dayton, Ohio, assignor to Monsanto Chemical Company, St. Louis, Mo., a corporation of Delaware No Drawing. Application July 5, 1957
Serial No. 669,973

4 Claims. (Cl. 260—481)

The present invention relates to surface-active agents and is particularly concerned with salts of a branched-chain tridecyl α-methyl-β-sulfopropionate as new compounds possessing a high degree of utility as detersive, wetting-out and lathering agents.

As is known, surface-active agents find wide application in a large number of industrial processes, especially those relating to the treatment of textiles, leather and other fibrous materials. Among the compounds heretofore suggested for this purpose is the sodium tridecyl β-sulfopropionate described in the co-pending Kosmin application Serial No. 569,980, filed March 7, 1956, now Patent No. 2,818,426. I have now found, as a result of comparative tests, that the heretofore unknown alkali metal tridecyl α-methyl-β-sulfopropionates are of outstanding value, not only for the purpose of assisting in the wetting of textile materials and also for the purpose of producing very good lathers, but also from the standpoint of very good detersive efficiency. Thus, while sodium tridecyl β-sulfopropionate shows extremely good lathering properties, it is not outstanding in detersive properties, and is somewhat deficient in wetting-out properties, particularly at low concentrations. Now I have found that the alkali metal tridecyl α-methyl-β-sulfopropionates are characterized by possessing, in very dilute solutions, not only improved detersive properties but also wetting-out properties which are substantially twice as good as those of said β-sulfopropionate at comparably low concentrations. As heretofore stated, the present alkali metal tridecyl α-methyl-β-sulfopropionates also exhibit very good lathering efficiency. The possession, by a single compound, of three significantly superior surface-active properties i. e., wetting-out, detersive and lathering abilities, is most unusual.

The present alkali metal tridecyl α-methyl-β-sulfopropionates are readily prepared according to the invention, by the addition reaction of the sulfoanhydride of isobutyric acid with a branched chain tridecanol obtained by the reaction of carbon monoxide and hydrogen with a hydrocarbon selected from the class consisting of triisobutylene and tetrapropylene, and neutralizing the resulting free acid with an alkali metal hydroxide, substantially according to the scheme.

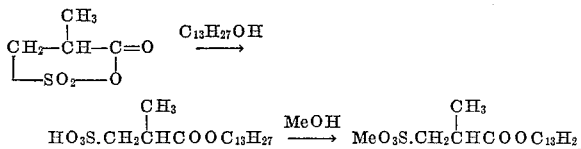

wherein Me denotes alkali metal and $C_{13}H_{27}$ denotes a branched chain tridecyl radical derived from said tridecanol. Alkali metal hydroxides which are presently useful are sodium, potassium and lithium hydroxides.

In effecting condensation of the sulfoanhydride with the tridecanol I prefer to operate substantially as follows: the branched chain tridecanol is added, advantageously in increments and with stirring, to the sulfoanhydride at ordinary or increased temperatures. Since the addition reaction of the sulfoanhydride with the tridecanol is a moderately exothermic reaction, external heating need not generally be employed, although under certain conditions, e. g., when reaction is effected in the presence of an inert diluent or solvent, external heating may be used. The reaction may be effected at ordinary, superatmospheric, or subatmospheric pressures. When the addition reaction has been completed, which can be ascertained by noting cessation in evolution of heat, the resulting 2-carbotridecoxypropanesulfonic acid is neutralized by treatment with alkali metal hydroxide. Advantageously, this can be effected by employing an aqueous solution of the hydroxide; but, as will be apparent to those skilled in the art, the neutralization may be effected either in the presence or absence of any diluent or solvent. The neutralized product is then dried in order to remove by-product water and/or water which may have been used as solvent. A product of good purity is obtained by solvent extraction, e. g., the neutralized product may be taken up in a liquid which is a solvent for the desired product and a non-solvent for any excess of inorganic material which may have been used, the resulting solution filtered and the solvent removed from the filtrate by volatilization. Solvents which may be employed for this purpose include, e. g., hot methanol or ethanol, acetone, ether, etc.

The present invention is further illustrated but not limited by the following examples.

Example 1

To a 500 ml. 3 neck flask equipped with stirrer, thermometer and dropping funnel there was charged 62.1 g. (0.31 mole) of the branched chain tridecanol obtained according to the "Oxo" process by the high pressure, high temperature reaction of carbon monoxide and hydrogen with triisobutylene or tetrapropylene. After heating the tridecanol to a temperature of 50–60° C. there was added dropwise 45.0 g. (0.3 mole) of the sulfoanhydride of isobutyric acid during a period of 40 minutes. A slightly exothermic reaction was evidenced. The resulting reaction mixture was stirred at 55–60° C. for 30 minutes and then allowed to attain room temperature. To the cooled mixture there was added 100 ml. of 70% ethanol and the whole brought to neutrality with 40% aqueous sodium hydroxide solution. Upon treating the neutralized product with ethanol some precipitation was noted. Filtration and subsequent treatment of the filtrate with hot ethanol, removal of the solids thus formed, and drying of the combined filtrates overnight in the vacuum oven at 50° C. gave a substantially anhydrous product. Upon stirring this product with 250 g. of acetone the solid which precipitated out was filtered off and dried in the vacuum oven at 50° C. to give 67.5 g. of the substantially pure, somewhat waxy sodium tridecyl α-methyl-β-sulfopropionate wherein the tridecyl radical is derived from said branched chain tridecanol.

Example 2

Employing the apparatus described in Example 1, the sulfoanhydride of isobutyric acid was reacted with the "Oxo" process tridecanol as follows:

The sulfoanhydride (34.0 g., 0.287 mole) was charged to the flask and 59.4 g. (0.29 mole) of the tridecanol described in Example 1 was added to the sulfoanhydride at room temperature in one portion. The exothermic nature of the reaction was evidenced by the fact that the temperature of the mixture rose to 78° C. within 1 minute. The reaction mixture was then stirred until it had attained room temperature. To the cooled solution there was added 100 ml. of absolute ethanol and the resulting solution was slowly neutralized with 40% aqueous sodium hydroxide solution. Approximately 300 ml. of ethanol was added to the neutralized reaction mixture, and the small quantity of white solid which precipitated was filtered off. The filtrate was dried in a stirred reactor under water pump vacuum to give 117.0 g. of the crude sodium tridecyl α-methyl-β-sulfopropionate. Twice repeated washing with 300 ml. portions of acetone and drying over night in the vacuum oven at 45° C. gave the white, somewhat waxy, substantially pure sodium tridecyl α-methyl-β-sulfopropionate wherein the tridecyl radical was derived from said branched chain tridecanol.

*Example 3*

The wetting-out efficiencies of the sodium tridecyl α-methyl-β-sulfopropionate of Example 1 and of sodium tridecyl β-sulfopropionate were determined by the Draves Test of the American Association for Testing Materials. The following results were obtained:

| Compound tested | Wetting speed—Draves method, seconds at percent concentration | | | |
| --- | --- | --- | --- | --- |
| | 0.125 | 0.0625 | 0.031 | 0.015 |
| Sodium tridecyl α-methyl-β-sulfopropionate | 2.9 | 5.7 | 14.7 | 53 |
| Sodium tridecyl β-sulfopropionate | 4.1 | 10.0 | 35.9 | 180+ |

*Example 4*

Evaluation of the detersive efficiency of the sodium tridecyl α-methyl-β-sulfopropionate of Example 1 as well as of sodium tridecyl β-sulfopropionate was conducted by using the method described by J. C. Harris and Earl L. Brown, Journal of the American Oil Chemists' Society, vol. 27, pp. 135–143 (1950). In this method the detergency of materials is compared with the detergency of Gardinol, a commercial product produced by sulfating the alcohols derived from coconut fatty acids. In water of 50 p. p. m. hardness the percent detergency of sodium tridecyl α-methyl-β-sulfopropionate was found to be 117, whereas that of said tridecyl β-sulfopropionate was found to be 102 in the same water hardness and under the same test conditions.

*Example 5*

The sodium tridecyl α-methyl-β-sulfopropionate of Example 1 was tested for lathering properties by the Ross-Miles Test of the American Society for Testing Materials. In water of 50 p. p. m. hardness the α-methyl-β-sulfopropionate was found to give 19.1 cm. of lather at once and 19.1 cm. of lather after 5 minutes.

What I claim is:

1. An alkali metal α-methyl-β-sulfopropionate of the formula

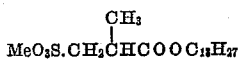

in which Me denotes alkali metal and $C_{13}H_{27}$ denotes a tridecyl radical derived from a branched chain tridecanol obtained by the reaction of carbon monoxide and hydrogen with a hydrocarbon selected from the class consisting of triisobutylene and tetrapropylene.

2. Sodium α-methyl-β-sulfopropionate of the formula

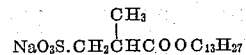

in which $C_{13}H_{27}$ denotes a tridecyl radical derived from a branched chain tridecanol obtained by the reaction of carbon monoxide and hydrogen with a hydrocarbon selected from the class consisting of triisobutylene and tetrapropylene.

3. The method which comprises contacting the sulfoanhydride of isobutyric acid of the formula

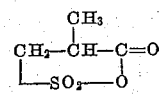

with a tridecanol obtained by the reaction of carbon monoxide and hydrogen with a hydrocarbon selected from the class consisting of triisobutylene and tetrapropylene, neutralizing the resulting reaction product with an alkali metal hydroxide, and recovering from the resulting reaction product an alkali metal α-methyl-β-sulfopropionate of the formula

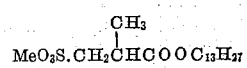

wherein Me denotes an alkali metal and $C_{13}H_{27}$ is a branched chain tridecyl radical derived from said tridecanol.

4. The method which comprises contacting the sulfoanhydride of isobutyric acid of the formula

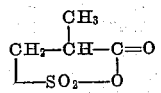

with a branched chain tridecanol obtained by the reaction of carbon monoxide and hydrogen with a hydrocarbon selected from the class consisting of triisobutylene and tetrapropylene, neutralizing the resulting reaction product with sodium hydroxide, and recovering from the resulting reaction product sodium α-methyl-β-sulfopropionate of the formula

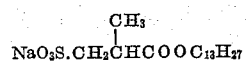

wherein $C_{13}H_{27}$ is a branched chain tridecyl radical derived from said tridecanol.

No references cited.